Dec. 26, 1939.    G. T. REICH    2,185,064
MANUFACTURE OF JELLIES AND THE LIKE
Filed July 2, 1937    2 Sheets-Sheet 1
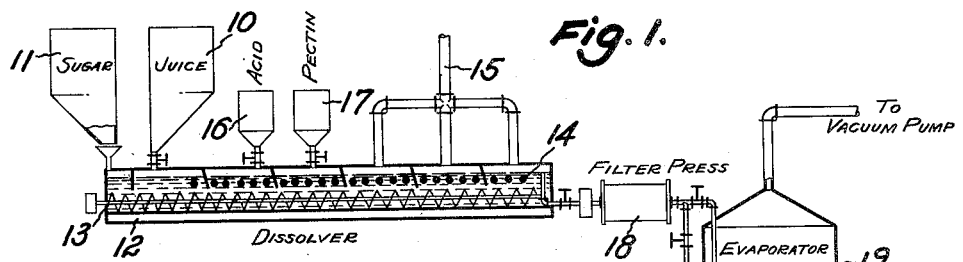
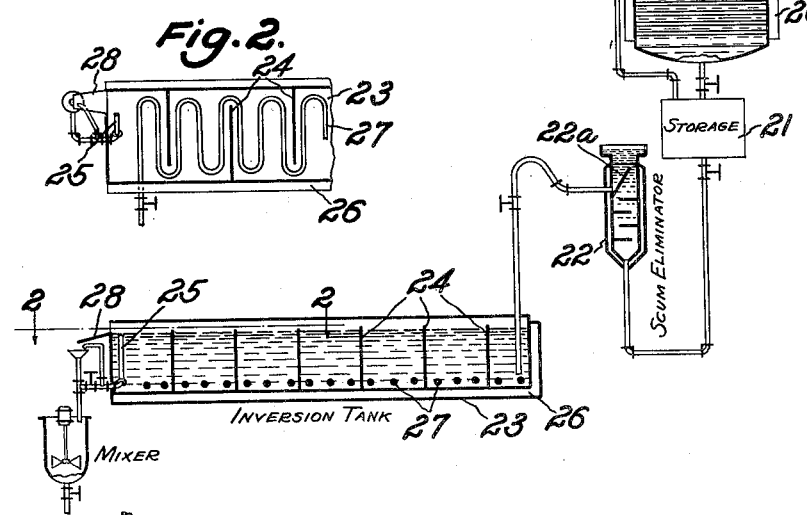
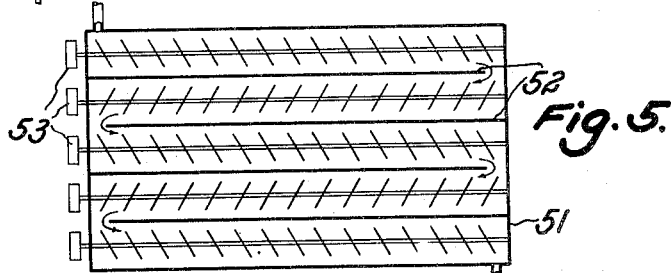
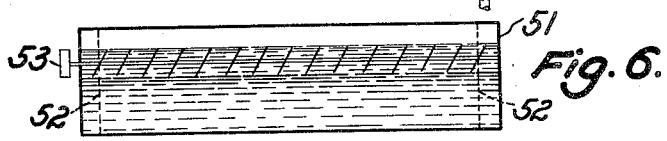
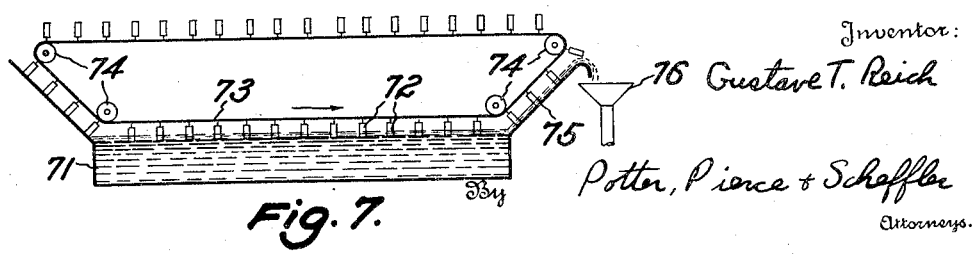
Inventor: Gustave T. Reich
By Potter, Pierce & Scheffler
Attorneys.

Dec. 26, 1939.      G. T. REICH      2,185,064
MANUFACTURE OF JELLIES AND THE LIKE
Filed July 2, 1937      2 Sheets-Sheet 2

Inventor:
Gustave T. Reich
By Potter, Pierce & Scheffler
Attorneys.

Patented Dec. 26, 1939

2,185,064

UNITED STATES PATENT OFFICE 2,185,064

MANUFACTURE OF JELLIES AND THE LIKE

Gustave T. Reich, Philadelphia, Pa., assignor to Pennsylvania Sugar Company, Philadelphia, Pa., a corporation of Pennsylvania Application July 2, 1937, Serial No. 151,760

5 Claims. (Cl. 99—132)

This invention relates to improved methods and apparatus for the production of jellies and similar food products.

In general jellies, marmalades and the like are prepared by adding substantial quantities of sugar to fruit juices and boiling for a predetermined period of time or until a sample responds to a test. The fruit juices are obtained by pressing, by maceration or by other suitable methods. The amount of water in the juices will vary with the nature of the fruit and particularly with the method used for extracting the juice. Acids or pectin or both may be added to the mixture whenever the original fruit juice is defective in either of these ingredients.

By tradition and experience the boiling of the fruit juice-sugar mixture has been considered the most important element in the making of jellies, and the quality of the jelly has been found to be so sensitive to this operation and so apt to suffer from apparently unpredictable disturbances that the manufacture of jellies in the past has been entirely carried out in relatively small batches and under the careful supervision of experienced jelly makers.

The boiling operation as heretofore carried out in the manufacture of jellies has included a number of desirable functions together with a number of undesirable effects. The functions of the boiling include the dissolving of the sugar, the concentration of the juice by removal of water, the inversion of at least a sufficient proportion of the sugar to prevent crystallization of sugar on standing and the coagulation of organic compounds which tend to cause cloudiness. These functions are not always compatible. For example, the juice may already be at approximately the desired concentration so that water must be added to compensate for the amount removed by boiling. Furthermore, the boiling tends to cause loss of flavor, darkening of the color of the product, destruction of pectin resulting in cloudiness and loss of jellying power, together with other undesirable effects. The result is that the jelly-making process as heretofore carried out has necessarily been a compromise between the desired and the undesirable effects and the consistent production of maximum yields of the highest quality of product has been impossible of attainment.

I have found that by proper control of the various phases of the jelly-making process and particularly by operating the jelly-making process in such a manner that each necessary function is effected without disturbing or unduly influencing the other functions, greatly increased yields of jellies of improved flavor, color and texture may be produced, and in addition it is possible to manufacture jellies of improved properties in a continuous process under standardized predetermined conditions with a uniformity of output which is not possible with the methods of the prior art.

A principal object of the present invention is the provision of a method for the manufacture of jellies which will give an increased yield of higher grade product.

A further object of the invention is to increase the capacity and uniformity of product of the present jelly-making equipment.

Another object is the provision of a method and apparatus for the more economical production of high grade jellies.

Another object is the provision of a method and apparatus for the continuous production of jellies.

Briefly stated, the principal of the present invention comprises the inversion of the sugar content of the jelly-forming mixture at a temperature below the boiling point, the mixture being boiled, if at all, only to the extent necessary to bring about any desired elimination of water. While it is a cardinal principle of the invention to give separate consideration to the different functions of the jelly-making process, this is not inconsistent with the intelligent combining of compatible functions to the extent that they are compatible. For example, the invention contemplates that at least a portion of any desired evaporation of water may be combined with the bringing of the sugar content of the jelly into solution. However, as soon as the jelly mixture has attained the desired concentration, boiling is stopped and all further functions, particularly the completion of the desired inversion of the sugar, are carried out under controlled conditions below the boiling point of the mixture.

The invention includes also the carrying out of the inversion of the sugar under predetermined and controlled conditions of time, temperature and hydrogen-ion concentration or pH. It has been found that inversion of the sugar takes place at a rate which is a function of the temperature and the pH so that these three conditions can be correlated to give a predetermined degree of inversion under conditions which are most favorable to the other functions of the jelly-making process and to the qualities of the resulting product.

For the purpose of illustrating the principles of the invention, it will be more particularly described with reference to the accompanying drawings in which:

Fig. 1 is a diagrammatic representation in partly sectional elevation of a jelly-making plant embodying the principles of the invention;

Fig. 2 is a plan view of a portion of the inversion tank of the apparatus of Fig. 1, on line 2—2 of Fig. 1;

Figs. 5 and 6 are a diagrammatic plan and sectional elevation respectively of a different form of inversion tank from those shown in Figs. 1-3; and Fig. 7 is a diagrammatic sectional elevation of a scum-eliminating device suitable for use with the method and apparatus of the invention.

Figure 3:
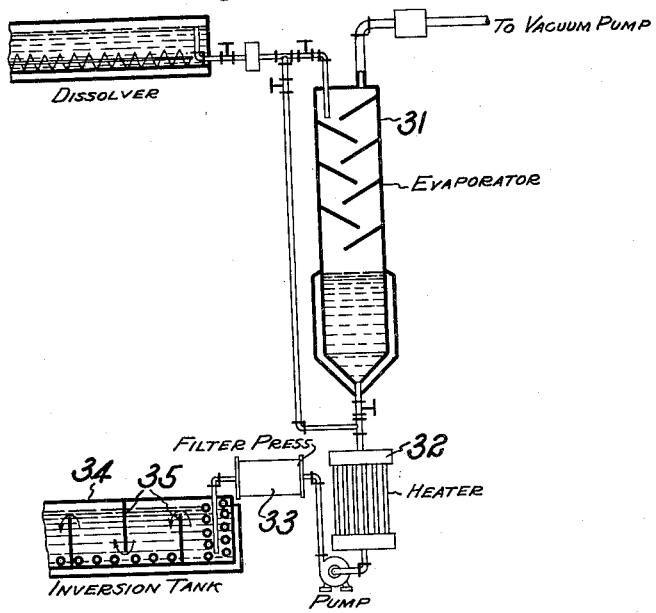
Figs. 3 and 4 are partial diagrammatic representations of two modified forms of jelly-making apparatus illustrating possible variations in the application of the principles of the invention.

In Fig. 1, fruit juice obtained in any suitable way and the proper proportion of sugar are continuously added from containers 10 and 11 respectively, to dissolver 12 which is a long, narrow covered tank or trough provided with a screw conveyor-agitator 13, heating coils 14 and vapor outlet 15. Acid and pectin may be added, if desired, from tanks 16 and 17 respectively. Under the influence of the heat and agitation the sugar is dissolved in the fruit juice and the materials are thoroughly blended. A certain amount of evaporation may be effected in the dissolver, if desired, and at times all the necessary evaporation is effected in this apparatus, the evaporated water being removed through outlet 15. The heating coils are preferably positioned near the top of the liquor in the tank where the mixture is most dilute so that evaporation is more efficient and danger of caramelizing the solid sugar in the bottom of the tank is eliminated. If desired the tank may be heated by a jacket instead of, or in addition to, the coils. The solution from dissolver 12 may be passed through filter press 18 if desired for clarification. This step may be omitted or it may be inserted at a later stage of the process. If further evaporation is desired the solution is passed into evaporator 19 where it is evaporated to the desired extent, preferably under vacuum, heat being supplied by steam in calandria 20. From the evaporator or directly from the dissolver the liquor is passed into storage tank 21 from which it is fed at a predetermined rate through scum eliminator 22, which is optional, to inversion tank 23.

This inversion tank is designed to submit the solution continuously and uniformly to a predetermined temperature below the boiling point of the solution for a time depending on the temperature and the hydrogen-ion concentration of the solution. In the inversion apparatus shown in Figs. 1 and 2 the solution flows through a series of compartments formed by alternating lateral baffles 24. The contents of the tank and therefore the time of travel of the solution through the tank are determined by the height of adjustable outlet pipe 25. The temperature of the solution is maintained at the predetermined point by jacket 26 and coil 27. The solution flowing from the inversion tank through outlet 25 is fed, after further skimming at 28, if desired, into mixer 29 from which it is packed in the final containers.

In the modification shown in Fig. 3 of the drawings any desired removal of water from the material coming from the dissolver is effected in flash evaporator 31, the heat content of the material being usually sufficient for the evaporation of the desired amount of water by pressure drop evaporation. The jacket lower portion of evaporator 31 serves as a storage for the material, which may be adjusted to the predetermined temperature for inversion of the sugar content in passing through heater 32 and clarified in filter press 33. Inversion tank 34 differs from the form shown in Figs. 1 and 2 in that the baffles 35 project alternately from the top and bottom of the tank instead of from alternate sides.

Figure 4:
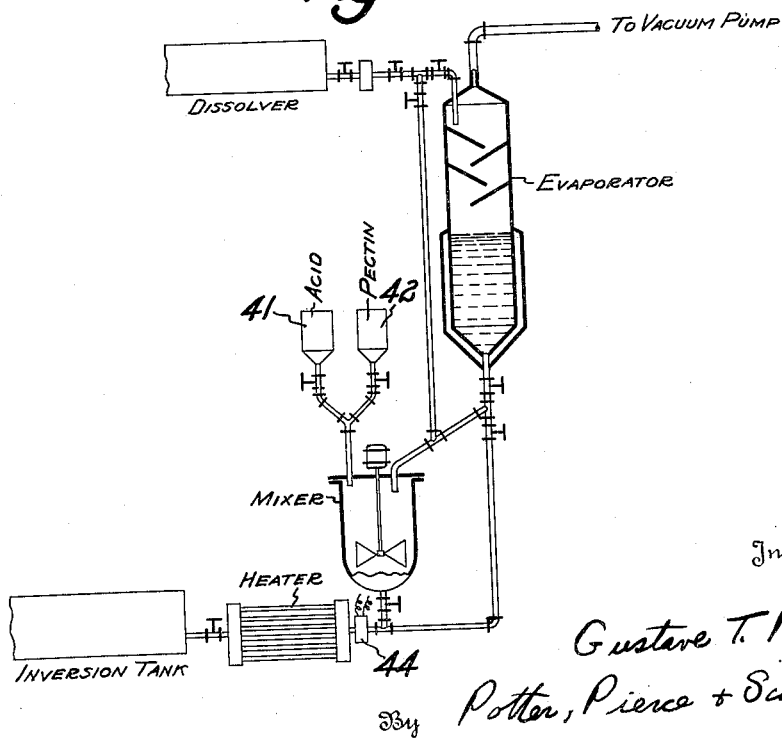

In the modification shown in Fig. 4 of the drawings the addition of acid or pectin or both is effected after the material is removed from the dissolver and has been brought to the desired concentration by evaporation when required. In the form of apparatus shown in this figure controlled amounts of acid and pectin are added from containers 41 and 42, respectively, to the material in mixer 43. The addition of acid may advantageously be controlled by device 44, positioned in the conduit from the mixer to the inversion tank, which is responsive to changes in hydrogen-ion concentration of the material in the conduit.

A further modification of the inversion tank is shown in Figs. 5 and 6. In this form the tank 51 is provided with a number of perpendicular baffles 52 projecting in alternation from opposite ends of the tank and forming a plurality of compartments through which the material undergoing inversion of its sugar content flows in succession. In the form shown in these figures each compartment is provided with an agitator 53 in the upper portion thereof. These agitators continuously break up the scum and reincorporate it in the material. If it is desired to remove the scum from the material this may be done, either before or after the material passes through the inversion tank as at 22 and 28 in Figs. 1 and 2. The scum eliminator 22 of Fig. 1 provides for the gentle flow of the material upwards in the same direction as the natural flow of the scum. The scum collects in the top of the vessel and is removed from time to time while the clear liquid is removed from a point near the top separated from the upflowing current by baffle 22a.

Fig. 7 shows a further device for the removal of scum from the liquid. In this device the scum is skimmed or scraped off the top of the liquid contained in tank 71, which may advantageously be a tank in which the inversion of the sugar content is effected. The mechanism for removing the scum comprises a plurality of scraper members 72, fastened to an endless belt 73, moving on pulleys 74 in the direction indicated by the arrow. The members 72 skim the scum from the surface of the liquid in the tank and drag it up the inclined apron 75 from which it flows into funnel 76.

As was pointed out above, and as will be apparent from the foregoing description, the method of the invention is not limited to any particular sequence or combination of operation. Inversion of the sugar may be effected at any desired point in the process after it has been dissolved in the fruit juice. Inversion of the sugar at controlled temperature below the boiling point, for example, at 200° F., may be effected immediately after the sugar is dissolved and evaporation of water in any desired amount may be effected subsequent to the inversion. This has the advantage that the liquid usually has a greater fluidity after inversion so that evaporation either at atmospheric pressure or under vacuum can be more readily effected particularly in continuous operation.

Instead of effecting the inversion in tanks, it may be carried out in jacketed pipes or in other suitable apparatus.

I claim:

1. In the manufacture of jellies and the like from fruit juices and sugar, the improvement which comprises removing water from the mixture of fruit juices and sugar, and inverting the major portion of the sugar content in separate operations, the inversion of the sugar being effected at a temperature below the boiling point of the solution.

2. A method of manufacturing jellies and the like which comprises dissolving sugar in fruit juice, evaporating water from the solution until it has attained a predetermined concentration, and thereafter completing the desired inversion of the sugar content of the solution by heating at a temperature below the boiling point of the solution.

3. A method of manufacturing jellies and the like which comprises dissolving sugar in fruit juice, evaporating water from the solution under vacuum until it has attained a predetermined concentration, and thereafter completing the desired inversion of the sugar content of the solution by heating at a temperature below the boiling point of the solution.

4. A method of manufacturing jellies and the like which comprises dissolving sugar in fruit juice in a proportion effective to produce a jelly upon inversion of a substantial portion of the sugar and inverting the sugar in the fruit juice by heating without substantial evaporation at a temperature below the boiling point of the solution until sufficient of the sugar is inverted to produce a jelly.

5. A method of manufacturing jellies and the like which comprises dissolving sugar in fruit juice, inverting the desired portion of the sugar content of the solution by heating at a temperature below the boiling point of the solution and thereafter evaporating water from the solution until it has attained a predetermined concentration.

GUSTAVE T. REICH.